May 14, 1940.  W. H. MORGAN  2,200,719
APPARATUS FOR MAKING PHOTOPRINTS
Filed May 20, 1938  2 Sheets-Sheet 1
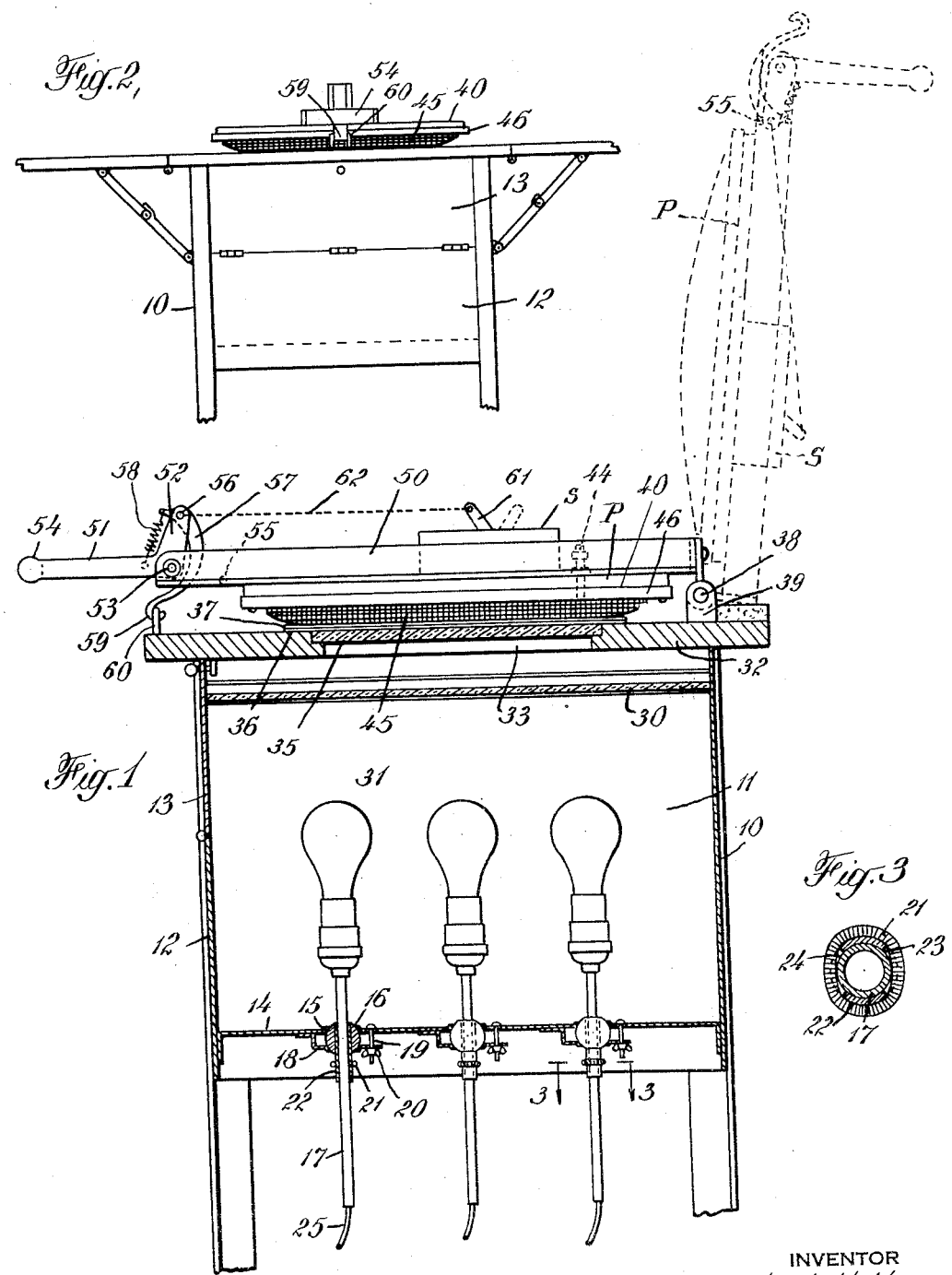
INVENTOR
Wilbert H. Morgan
BY
Marshall & Hawley
ATTORNEYS May 14, 1940. W. H. MORGAN 2,200,719
APPARATUS FOR MAKING PHOTOPRINTS
Filed May 20, 1938 2 Sheets-Sheet 2
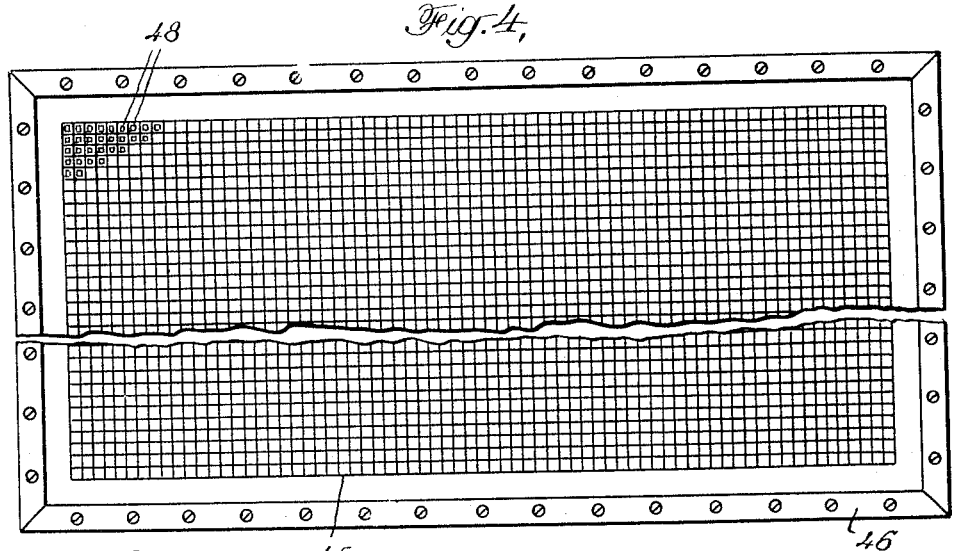
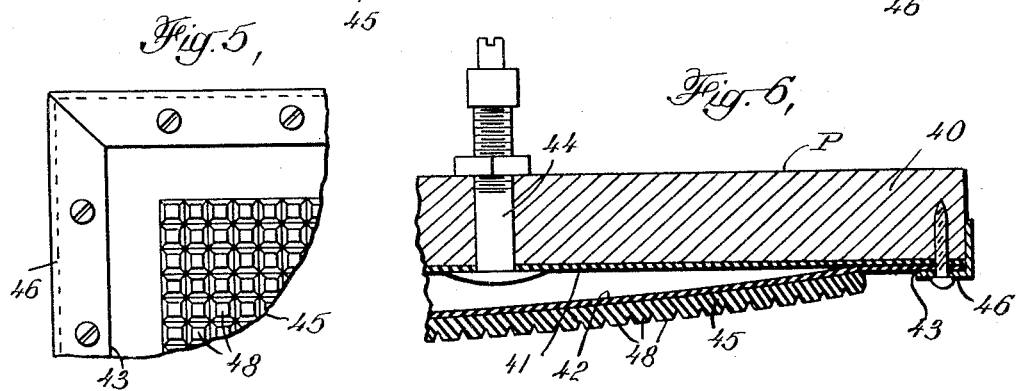
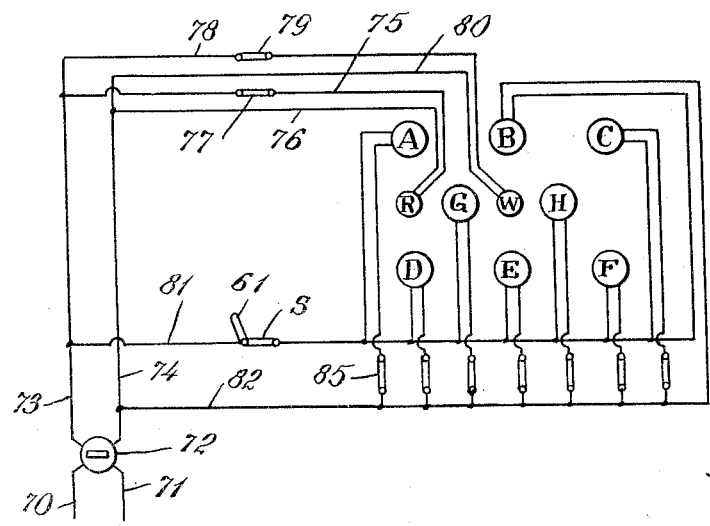
INVENTOR
Wilbert H. Morgan
BY
ATTORNEYS Patented May 14, 1940

2,200,719

UNITED STATES PATENT OFFICE 2,200,719

APPARATUS FOR MAKING PHOTOPRINTS

Wilbert H. Morgan, Howard Beach, N. Y.

Application May 20, 1938, Serial No. 208,959

2 Claims. (Cl. 95—73)

This invention relates to apparatus for making photoprints.

More particularly stated, the invention relates to apparatus for making prints on sensitized paper from negatives which may consist of a photographic film, a negative print or a paper to be copied, such as a letter, check, etc.

Many photoprinting machines now in use are provided with a glass plate between the light or lamps and the negative. A platen is provided for pressing and holding the sensitized print paper in contact with the negative and for holding the negative in contact with the glass plate. Unless the paper is in perfect and complete contact with the negative and the negative is in perfect contact with the glass plate, air pockets will be formed and the print will be blurred and imperfect. It is particularly difficult to obtain perfect contact due to variations in the thickness of materials used and to the use of guides or masks.

In apparatus of the character described, it is also essential that means be provided for adjusting the lamps angularly and toward or from the glass plate through which the light is transmitted.

This invention has for its salient object to provide printing apparatus of the character specified having a platen so constructed and arranged as to prevent the formation of any air pockets and to insure perfect contact between the sensitized print paper and the negative and between the negative and the glass plate.

Another object of the invention is to provide a platen so constructed and arranged that the sensitized paper will be first engaged substantially at the center and then will be successively engaged radially or laterally from the center outwardly, thereby forcing out all air between the print paper and the negative and between the negative and the glass support upon which it is mounted.

Another object of the invention is to provide a platen with a surface so constructed that the sensitized paper will be frictionally engaged and held against slipping or sliding movement as the platen is engaged therewith and clamped in closed position.

Another object of the invention is to provide means operable when the platen is closed and locked in closed position for closing the lamp circuit.

Another object of the invention is to provide in apparatus of the character described, an improved lamp mounting so arranged that the lamps can be adjusted toward or away from the glass supporting plate or can be angularly adjusted relative thereto.

Further objects of the invention will appear from the following specification taken in connection with the drawings which form a part of this application, and in which Fig. 1 is a vertical sectional elevation of apparatus constructed in accordance with the invention, the platen being shown in dotted lines in open position and in full lines in closed position;

Fig. 2 is an elevational view taken at right angles to Fig. 1;

Fig. 3 is an enlarged sectional elevation taken substantially on line 3—3 of Fig. 1;

Fig. 4 is a top plan view, partly broken away, of the platen;

Fig. 5 is a fragmentary view showing a corner of the platen and details of the friction surface;

Fig. 6 is an enlarged sectional elevation of a part of the platen; and

Fig. 7 is a diagrammatic view showing a wiring diagram of the lamp circuits.

The invention briefly described consists of photoprinting apparatus, including a lamp chamber or cabinet in which the lamps are vertically and angularly adjustable and having a glass supporting plate at the upper end thereof through which the light is transmitted and on which the negative and sensitized paper are supported during the printing operation. There is hinged to the top of the cabinet a platen comprising a frame or support and a pneumatic paper engaging cushion or surface. The pneumatic cushion comprises a closed pneumatic chamber in which air is forced through a suitable valve and a friction surface carried thereby and engageable with the outer surface of the sensitized paper. The cushion and paper engaging surfaces are so formed that when the platen is closed the center of the cushion engages the outer surface of the sensitized paper first and as the downward pressure is increased the paper is engaged laterally or radially from the center by frictional projections in the form of a plurality of separate protuberances which may have a pyramidal shape. These projections successively engage the outer surface of the print paper and prevent any slippage as the platen is closed and, furthermore, provide for uniform pressure over the outer surface of the print paper and force the paper into complete engagement with or contact with the negative, even where there are variations in thickness and the platen surface engages a mat or mask which provides an additional thickness to be compensated for.

The platen is also provided with a switch for closing the lamp circuit, this switch being controlled by the handle which is used to open and close the platen in such a manner that when the platen is latched in closed position the circuit is closed and when the platen is unlatched the circuit is opened.

Further details of the invention will appear from the following description.

In the form of the invention illustrated in the drawings, there is shown a cabinet 10 having a lamp chamber 11, one wall 12 of the cabinet being provided with a hinged door 13 to give access to the chamber 11.

The bottom 14 of the lamp chamber is provided with a plurality of openings 15 in which are mounted spherical bearings or balls 16 through which extend the lamp supporting tubes or posts 17.

The spherical bearings or balls 16 are frictionally held in the openings 15 by pressure exerted by resilient plates 18, this pressure being controlled by bolts 19 and wing nuts 20.

The tubes or posts 17 are vertically slidable through the central openings in the balls 16, but are frictionally held in any desired vertical position of adjustment by means of circular springs 21 which are mounted on sleeves 22 carried by the balls 16 and extending downwardly therefrom the sleeves being slotted or recessed, as shown at 23 and 24, to permit the springs 21 to engage the tubes or posts 17. The wires 25 for the lamps extend upwardly through the tubes 17.

The ball bearings 16 permit the lamp to be angularly adjusted in the opening 15 and the tube 17 can be moved upwardly or downwardly through the ball and sleeve 22, being held in any desired position by the spring 21.

A glass plate 30, preferably of opal glass, is mounted above the lamps 31 and the top of the cabinet 10 is provided with a top plate or support 32 having an opening 33 above the plate 30. A plate 35 is mounted in the opening 33, preferably of plate glass, which forms the support for the negative 36 to be printed and the sensitized print paper 37.

In order to firmly and securely press the negative and the print paper downwardly on the glass supporting plate 35, the apparatus is provided with a platen P which is hinged at 38 to lugs 39 carried by the supporting plate 32.

The platen P comprises a base or main frame 40 which has secured to its undersurface a rectangular closed pneumatic bag comprising two sheets 41 and 42 of rubber or rubber composition, which are vulcanized together or closed at their outer edges, as shown at 43. The outer sheet 41 has extending therethrough a valve stem 44 of the usual construction, the stem extending outwardly through the frame or platen base 40. Air is pumped through the valve stem and valve into the air chamber formed between the sheets 41 and 42 which form the bag and air chamber.

The sheet 42 has cemented or otherwise secured thereto a sheet 45 which forms the frictional paper engaging surface. This sheet, as shown particularly in Figs. 4, 5 and 6, does not extend entirely to the edges of the platen, but has its outer edges spaced therefrom and from the strips 46 which engage the outer edges of the pneumatic bag to the base 40. The sheet 42 has a margin of approximately one-half an inch between the outer edges of sheet 45 and the strip 46, which provides a flexible margin and permits the sheet 45 to be pressed flat against plate 35.

The outer surface of the sheet 45 has formed thereon a plurality of projections 48 which, in the form of the invention shown, are pyramidal in shape.

The pneumatic cushion is thickest at the longitudinal and transverse center thereof and thus as the platen is closed, the outer surface of the sensitized paper is first engaged by the center of the surface or sheet 45. As a downward pressure is increased or continued the outer surface of the sensitized paper is engaged successively from the center of the cushion and of the friction sheet 45 outwardly. The engagement of the paper with the projections 48 prevents any tendency of the paper to slip or slide out of position as the platen is closed. Furthermore, since the surface of the sheet 45 is formed with a plurality of frictional projections, a perfect contact between the sensitized paper and the negative and between the negative and the plate 35 is insured.

The platen base 40 has secured to its outer surface a frame 50, and a bell crank lever comprising arms 51 and 52 is pivoted at 53 to the front end of the frame 50. A handle 54 is formed on the outer end of the bell crank lever arm 51.

When the platen is in open position the bell crank lever is disposed in the position shown in dotted lines in Fig. 1, or with the lever arm 51 substantially at right angles to the frame 50 and platen base 40. A stop 55 is provided for holding the bell crank lever in this position.

The arm 52 of the bell crank lever has pivoted thereon at 56 a latch 57, one end of which is engaged by a spring 58 which tends to swing the latch in an anticlockwise direction. A hook 59 is formed on the lower end of the latch 57 and is engageable with a staple or eye 60 carried by the top plate 32 of the cabinet 10.

Means is provided in connection with the bell crank lever for opening and closing the lamp circuit for the lamps 31. This means consists of a switch S mounted on the platen frame 40 and having an upwardly extending arm 61 which is connected by a flexible connection or wire 62 to the bell crank lever arm 52. When the switch arm 61 is in the dotted or dash line position shown in Fig. 1, the lamp circuit is open.

To close the platen the handle 54 is engaged by the operator and the platen is swung downwardly with the bell crank lever in a position substantially at right angles to the platen frame. After the platen has reached its lower position and pressure has been exerted thereon, the bell crank lever is swung to the position shown in full lines in Fig. 1, engaging the hook 59 with the eye or staple 60. As the bell crank lever is thus swung in an anticlockwise direction on its pivot 63, the cord or wire 62 will pull the lamp switch arm 61 from the dotted line to the full line position shown in Fig. 1, thus closing the lamp circuit.

When the print has been made the bell crank lever is swung into clockwise direction, releasing the hook 59 from the eye 60 and at the same time permitting the switch arm 61 under spring pressure to move to the open position shown in dotted lines in Fig. 1.

The lamp circuit is shown diagrammatically in Fig. 7. In this figure the power lines or mains are shown at 70 and 71. The main control switch 72 is provided for connecting the power lines to the lamp circuit. From the switch 72 the circuit passes to wires 73 and 74. Two pilot lights, designated R and W, are mounted in the chamber 11, one of these lights being red and the other white. The circuit for the pilot light R passes from the wire 73 through a wire 75 to the lamp R and from the lamp back through a wire 76 to the wire 74. The wire 75 has a switch 77 mounted therein.

The circuit for the lamp W passes from wire 73 through a wire 78 and switch 79 to the lamp W and from the lamp back to the wire 74 through a wire 80.

Any desired number of lamps may be mounted in the lamp chamber 11 and in the wire diagram there are shown eight lamps A, B, C, D, E, F, G and H.

The main lamp circuit from the wires 73 and 74 extends through wires 81 and 82, connected respectively to the wires 73 and 74. The switch S above described, is mounted in the wire 81 and the switch control arm 61, as above described, is controlled by the bell crank lever mounted on the platen.

Each of the lamps A, B, C, D, E, F, G and H is connected across the wires 81 and 82 in the manner shown in the wiring diagram, and a separate switch 85 is provided in each lamp circuit so that any desired number of lamps can be utilized. Since the wiring diagram clearly shows the circuit for the lamps, any further detailed description is not deemed necessary. It should be noted, however, that in order to close the lamp circuits through any of the lamps having their switches 85 closed, it is necessary to close the switch S.

From the foregoing specification it will be evident that simple, practical and effective printing apparatus has been designed, in which means is provided for vertical and angular adjustment of the lamps, for effectively preventing air pockets and insuring complete and perfect contact between the print paper and the negative and the negative and the glass on which the negative is mounted, and for insuring the closing of the lamp circuit when the platen is moved to closed position, and the opening of the lamp circuit when the platen is unlatched and swung upwardly to open position.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In photoprinting apparatus, a support for the negative and sensitized paper and a platen mounted to move toward and away from said support to press the paper and negative into contact with each other, said platen having an inflated pneumatic cushion on the under surface thereof, said cushion having secured to its outer surface a sheet of flexible material having projecting therefrom a plurality of uniformly arranged projections to frictionally engage the print paper from the center of the cushion outwardly to the edges thereof, the outer edges of the flexible sheet being spaced inwardly from the outer edges of the cushion.

2. In photoprinting apparatus, a support for the negative and sensitized paper and a platen mounted to move toward and away from said support to press the paper and negative into contact with each other, said platen having a cushion on the under surface thereof, the paper engaging surface having a plurality of uniformly arranged, friction, paper engaging projections thereon, said cushion being thicker at the center thereof and tapering in thickness from the center to the outer edges thereof, said projections engaging the paper first at the center and then outwardly to the edges thereof, thus holding the paper firmly in position from its first engagement therewith.

WILBERT H. MORGAN.